March 15, 1960     H. E. POWELL     2,928,224
WASTE COTTON HARVESTER
Filed April 7, 1958     3 Sheets-Sheet 1
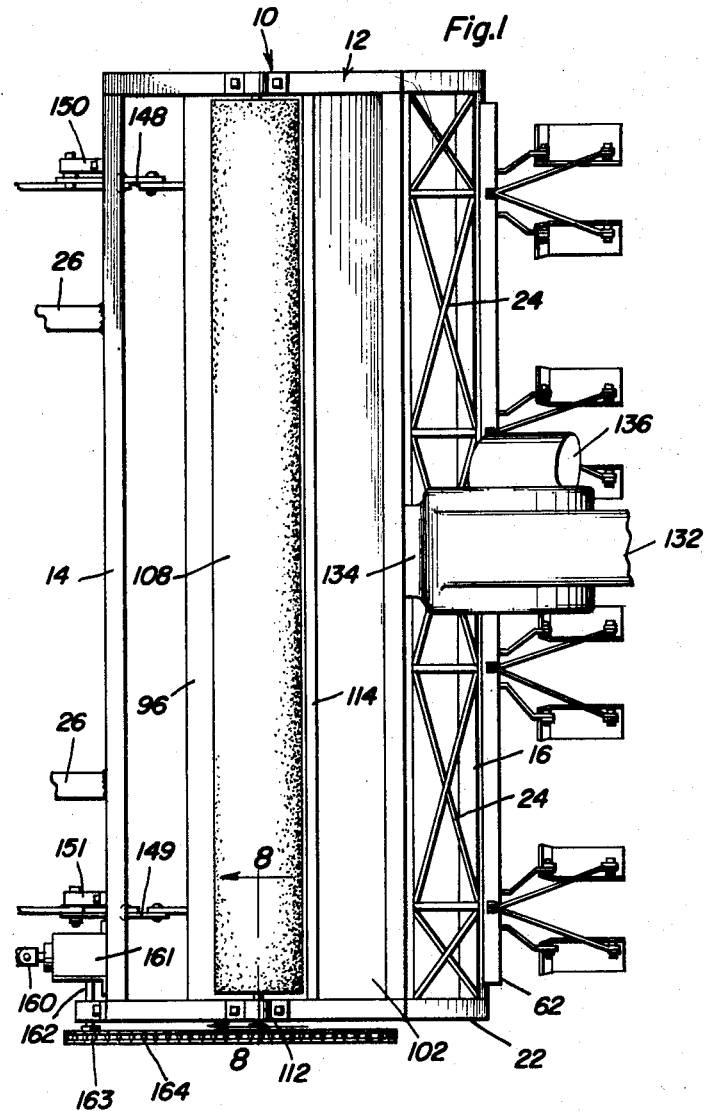
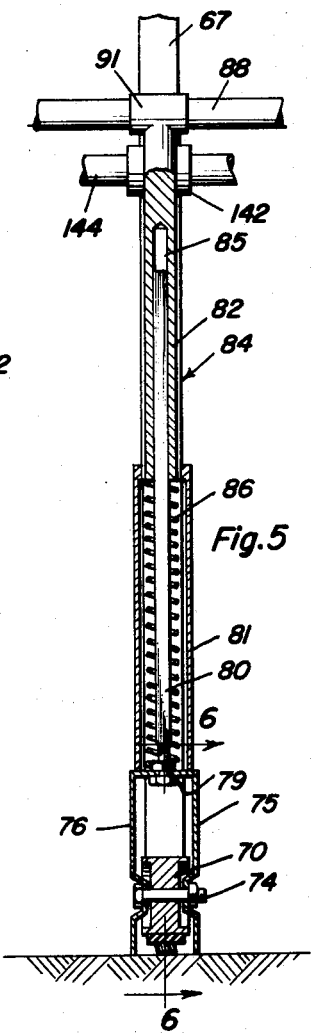
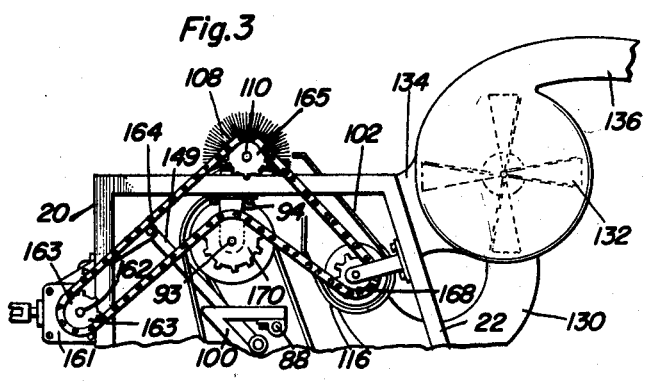
Hersel E. Powell
INVENTOR.

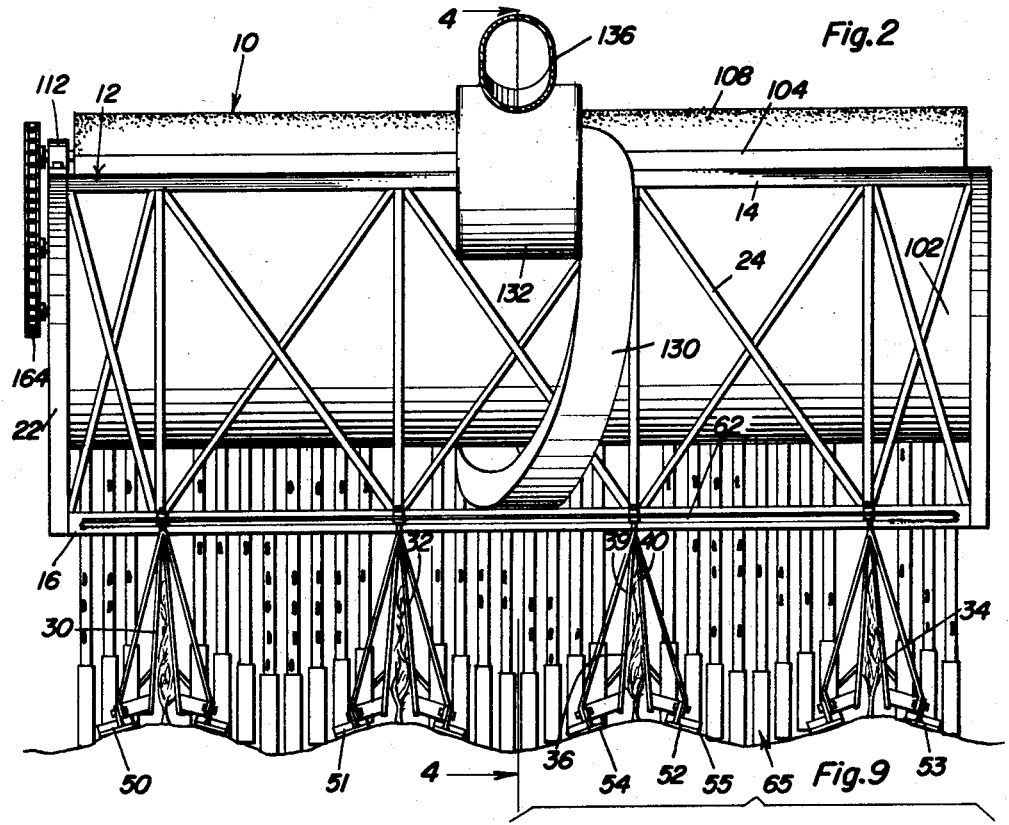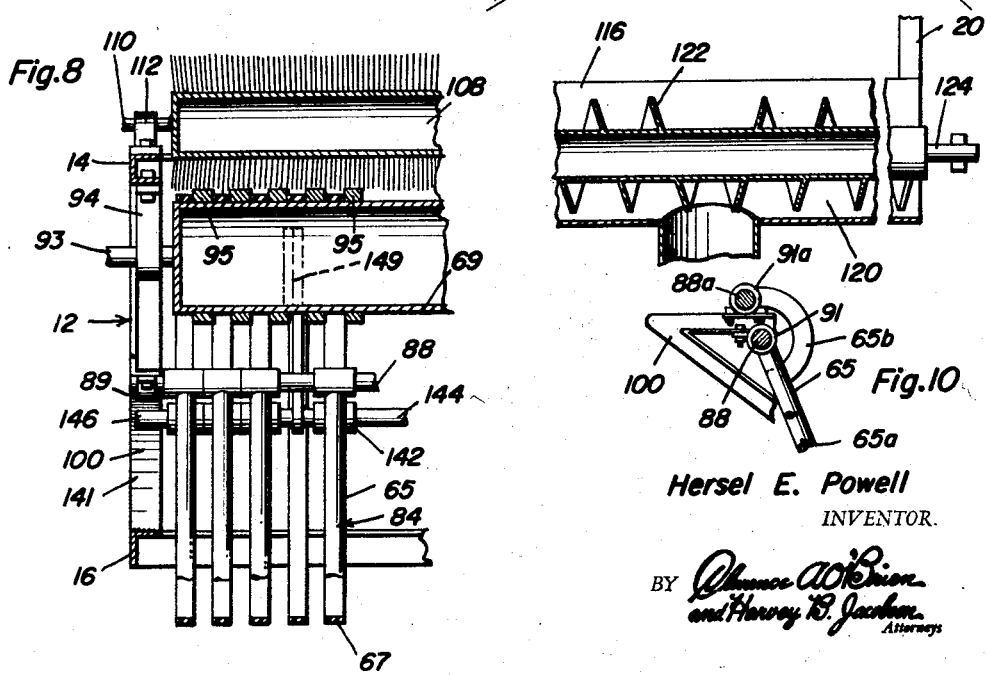

March 15, 1960  H. E. POWELL  2,928,224
WASTE COTTON HARVESTER
Filed April 7, 1958  3 Sheets-Sheet 3

Hersel E. Powell
INVENTOR.

United States Patent Office 2,928,224
Patented Mar. 15, 1960

2,928,224
WASTE COTTON HARVESTER
Hersel E. Powell, Lubbock, Tex.

Application April 7, 1958, Serial No. 726,754

16 Claims. (Cl. 56—28)

This invention relates to harvesters and particularly to mechanical harvesters for recovering waste cotton after original harvesting is complete.

A considerable quantity of cotton is hand-picked or abandoned after what is considered to be complete harvesting is accomplished. Hand-picking is very tedious, involving a large number of man hours and is therefore expensive. An object of this invention is to provide a machine for recovering the cotton that remains in the cotton field after harvesting, this machine having a unique arrangement of pickers, picker structures and supporting frame and other structure which enables the recovery of an astoundingly large percentage of the cotton that remains in the field after passes of a conventional cotton harvester.

Although prior machines have been made for the purpose of recovering waste cotton, as far as can be determined, these prior machines have drums with picker fingers on the drums. The picker fingers simply roll over the cotton bolls and impale them. In distinction to this type of machine, the present invention entails a machine that has a main frame together with a plurality of side-by-side pickers. Each picker has an endless conveyor which is adapted to be swung between the picking and the raised positions by means of a novel conveyor supporting structure and adjusting mechanism for that supporting structure. The supporting structure is extensible and spring biased to an extended position so that it automatically functions as an endless conveyor tightener. The plants in the rows are retained in their substantially original organization in the use of this invention inasmuch as there are shields that fit alongside of the plants in the row and serve the principal function of picking up the drooping sides of the plant and enabling effective picking in the places which are located beneath the boughs of the plants.

A more general object of the invention is to provide a waste cotton harvester which recovers more cotton than previous waste cotton harvesters and which does the job in a rapid and effective manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of a harvester constructed in accordance with the invention.

Figure 2 is a rear view of the harvester in Figure 1.

Figure 3 is a fragmentary side view of the harvester in Figure 1 showing principally the drive for the operating mechanism in the harvester.

Figure 5 is a sectional view taken on the line 5—5 of Figure 4 and showing an extensible support of one of the pickers.

Figure 8 is a fragmentary sectional view taken on the line 8—8 of Figure 1.

Figure 9 is an enlarged sectional view taken on the line 9—9 of Figure 4 and showing how the recovered cotton, after stripping from the pickers, is channeled into a duct for dispatch to a truck or some other remote location.

Figure 10 is a fragmentary sectional view showing a modification of the harvester.

Figure 4:
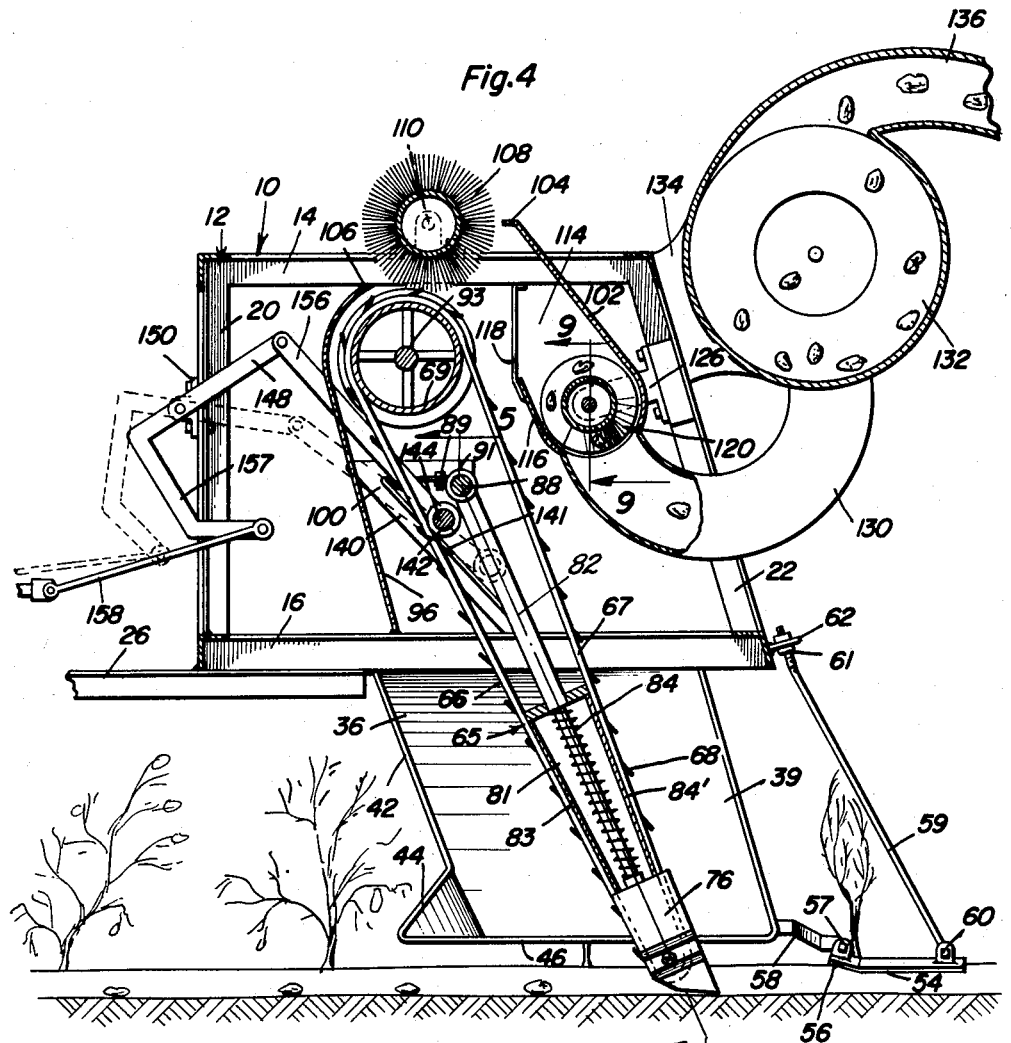
Figure 4 is a sectional view taken on the line 4—4 of Figure 2.
Figures 6, 7:
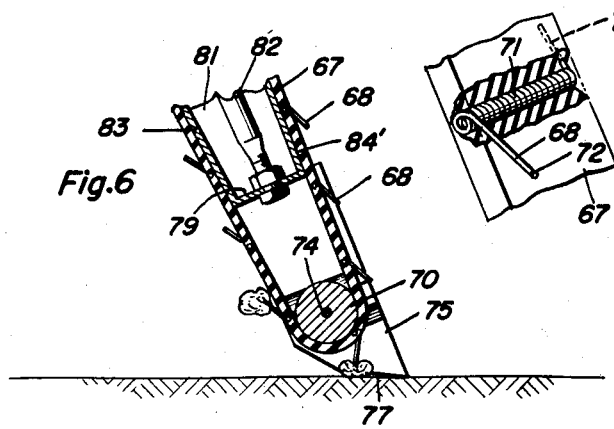
Figure 6 is an enlarged sectional view taken on the line 6—6 of Figure 5 and showing one of the pickers in operation.
Figure 7 is an enlarged fragmentary perspective view with parts being broken away and shown in section showing a suggested method of manufacturing one of the endless conveyors of one of the pickers and an impaling finger of which there are numerous in each conveyor.

In the accompanying drawings there is a waste cotton harvester 10. It includes a main frame 12 whose construction may be varied somewhat so long as there is sufficient structural support for the operating mechanism of the harvester. By way of example frame 12 is made of angle iron and has an upper rectangular subframe 14 together with a lower rectangular sub-frame 16 of equal length but of greater width. Vertical braces 20 connect the front edges of subframes 14 and 16 and rearwardly and downwardly inclined braces 22 connect the rear edge of the upper subframe to the rear edge of the lower sub-frame. Diagonal bracing 24 is used where required (Figures 1 and 2). Tongue 26 may be of one piece or multi-parts, is attached to the main frame 12 and is adapted to be connected, by a standard coupling, to a source of draft power, as a tractor.

There are a plurality of shields 30, 32, 34 and 36 respectively attached to the sub-frame 16 of frame 12 and depending therefrom. Each shield is made of two side walls, for example, see shield 36 having side walls 39 and 40, that are attached to the sub-frame 16 at their upper ends and diverge as they approach their lower edges. They enclose a dihedral angle the front edges 42 (Figure 4) of each side 39 and 40 are slanted downwardly and rearwardly with respect to the normal direction of movement of the harvester. The lower edge portions have forwardly and outwardly diverged deflectors 44 to guide the plants of a row in between the sides 39 and 40 of the shield. The lower edges 46 of each side of the shield have a normal position slightly above the surface of the soil which forms the hills of the cotton rows. The purpose of having the shields is to pick up the boughs of the plants in a cotton row and elevate them, squeezing them close together to permit the pickers to recover the cotton that has fallen beneath these spread boughs of the cotton plant. Although four shields are illustrated in Figure 2 it is understood that a larger or smaller number of such shields may be included in a single machine depending on the size of the machine which is made.

Each shield has a pair of runners trailing behind it and contacting the soil alongside of the plants of the cotton rows. There are pairs 50, 51, 52 and 53 of runners operatively connected with the shields 30, 32, 36 and 34. The pair 52 of runners consists of two runners 54 and 55 that have slightly upturned front ends 56 (Figure 4) to which pivot connector 57 is fastened. This pivot connector is also fastened to an arm 58 attached to the lower rear corner of wall 39 thereby suspending the leading edge of the runner 54. The rear end of the runner is supported by a link 59 attached by pivot connector 60 to the runner and attached by bolt and nut assembly 61 to a bracket 62 that is attached to the rear frame member of sub-frame 16. The bolt and nut assembly 61 is adjustable in the bracket 62 thereby providing for an adjustment of the runner 54.

There is a group of pickers 65 carried by frame 12 and depending beneath the sub-frame 16 thereof. The pickers are each inclined rearwardly in respect to the movement of the harvester and they are located alongside of the plant shields. Each picker, for example picker 66 in Figure 4, is made of an endless conveyor 67 having a plurality of spaced fingers 68 carried by it. Endless conveyor 67 is an endless resilient belt, for example, rubber or certain plastics or rubber compositions, and is entrained over an upper drum 69 and a lower roller 70. The picker fingers 68 are adapted to impale the cotton and may be made in a number of ways. One method of manufacture is to embed a wire coil 71 in the material of the endless conveyor 67 and have one end 72 of the wire coil protrude outwardly from the outer face of the conveyor 67 in such a manner so as to form, respectively, on opposite sides of the end 72 an acute and obtuse angle with the acute angle facing the direction of movement of the endless conveyor. The other end 73 of the coil 71 can be anchored or can be faced parallel and approximately coplanar with end 72 to thereby form a second impaling finger.

The lower end of the picker is formed by roller 70 mounted on axle 74 which extends between and is journalled in a pair of debris deflector plates 75 and 76 that are countersunk to accommodate the head and nut of the bolt that forms axle 74. Deflector plates 75 and 76 have angled lower edges 77 to ride over the soil surface. The lower wall 79 connects deflector plates 76 and 75 and accommodates rod 80. The rod 80 is concentric with housing 81, the latter fixed to wall 79 and extensibly slidably disposed on sleeve 82. The housing has flat front and rear walls 83 and 84' that provide surfaces against which the two flights of the endless conveyor 67 are guided. This keeps the flights of the conveyor from becoming disarranged and functions as a guide for the conveyor.

Housing 81, rod 80 and sleeve 82 constitute parts of extensible support 84 whose function is to support the endless conveyor 67. Rod 80 and housing 81 are joined together since the rod is bolted to wall 79 and housing 81 is also fixed to this wall. Rod 80 and housing 81 slide inwardly and outwardly of sleeve 82, with the housing disposed on the outside of the sleeve 82 and the square rod 80 slidable in square bore 85 of sleeve 82, preventing the lower part of the picker assembly from twisting. There are yielding means opposing the movement of the parts of the extensible support in one direction and aiding the movement of these parts in the opposite direction. These resilient means consist preferably of a spring 86 that reacts and seats against the outer end of sleeve 82 and wall 79. Accordingly the spring functions as a conveyor tightener inasmuch as it tends always due to the stored energy in spring 86, to extend the endless conveyor.

A transverse pivot shaft 88 is carried by bearings 89 on mounting brackets 100. There is one bracket 100 at each end of main frame 12 and secured to the sides of sub-frame 16. The upper end of the sleeve 82 of each picker has bearing 91 of the sleeve type, pivoted on the pivot shaft 88. This constitutes means by which the extensible support of each picker is mounted for pivotal movement on the main frame 12 of the harvester. The pivot axis is located below the drum 69.

Referring to Figure 10, the modification concerns the mounting of pickers 65. Instead of all of the pickers being pivoted to a single pivot shaft 88. Alternate pickers 65a are pivotally attached, by sleeve bearings 91a to a second transverse pivot shaft 88a. For clearance, pickers 65a and for parts of bearings 91a are contoured, as by a recess 65b. Pivot shaft 88a is mounted in bearings in a manner similar to the mounting of shaft 88.

Drum 69 has its axis of rotation established by shaft 93 whose ends are supported by bearings 94 suspended from the ends of the upper sub-frame 14. Shaft 93 is parallel to pivot shaft 88 and is power driven. Drum 69 has a plurality of circumferential bands 95 on its periphery and they act as spacers for the conveyors of each picker. The conveyors are located between the bands 95, Figure 8, and are actuated by drum 69. A guard 96 is disposed between the upper and lower sub-frames 14 and 16 and attached to them. It is located, in front of, the group 65 of pickers and has a curved upper part (Figure 4) that generally follows the contour of drum 69 but which is spaced sufficiently from the drum to enable the endless conveyors of the pickers to operate freely therebetween. A rear wall 102 is attached to the rear braces 22 and to the upper sub-frame 14 and it extends completely across the harvester 10. The upper edge 104 of wall 102 is spaced from the upper edge 106 of wall 96 thereby leaving an opening within which stripper 108 is operable. Stripper 108 is an elongated cylindrical brush having shaft 110 or trunnions at its ends that are mounted for rotation in bearings 112. The bearings 112 are located on the ends of upper sub-frame 14 and mount the brush so that it can rotate in super-position to the drum 69 (Figure 4). The bristles of the brush contact the picker fingers 68 and sweep the cotton therefrom with sufficient force to propel it into passageway 114 established by wall 102 and wall 116 that is approximately parallel to wall 102 but which has an opening 118 along its upper edge and in registry with the cotton path of travel as it is propelled from the picker fingers and into passageway 114. Opening 118 constitutes the entrance to passageway 114, the passageway terminating in an elongated auger housing 120 having auger 122 mounted for rotation in it. The ends of the auger have spindles 124 that are mounted for rotation in bearings 126 carried by braces 22 at the rear of the harvester 10 by frame 12. A blade on the auger 122 is constructed so that it feeds toward the center and into a duct 130 that is registered with the center of auger housing 120. Blower 132 is secured to the main frame 12 by bracket 134 and has a discharge pipe 136 which can be connected with a flexible hose or which can discharge directly into a wagon, cart, etc. Bracket 134 can be varied in size and can be made adjustable so that the location of blower 132 is optional. Power for operating the blower 132 can be obtained from any source, one of which is the power train of the harvester 10.

Brackets 100 mount pivot shaft 88 for the individual pickers 66. One side 140 of each bracket 100 is inclined with respect to either the vertical or horizontal directions and has a flat cam surface 141. The ends 146 of cam shaft 144 are disposed on cam 141 so that when the shaft 144 is translated it will be displaced laterally with respect to its longitudinal axis since it moves on cam 141. The cam followers 142 are rollers on shaft 144 which contact the bottom surface of the sleeves 82 of each of the extensible supports of the group 65 of pickers. A modification of this construction entails the installation of two additional rollers, one being on each end 146 of the cam shaft 144 and operable on cam surface 141 of brackets 100.

There are means for adjusting the position of cam shaft 144 and thereby altering the positions of each of the pickers 65. These means consist of linkages 148 and 149 pivoted on bearings 150 and 151 that are carried by braces 20 extending between the upper sub-frame 14 and the lower sub-frame 16. Each linkage has (see Figure 4) a link 156 that is pivoted at one end to the cam shaft 144 and a bellcrank 157 pivoted to the link 156. An adjusting arm 158, extending from a tractor or the like, is attached to bellcrank 157 and is adapted to actuate linkage 148. At the same time linkage 149 is simultaneously actuated inasmuch as the operating arm 158 is a part of a pair which operate in unison.

The power take-off of the towing vehicle is connected by shafting 160 to a gear box 161 carried by the frame 12 of the harvester. Output shaft 162 of gear box 160 has a sprocket 163 on it and around which endless chain 164 is entrained. This chain is entrained over sprocket 165, the latter secured to the trunnion 110 of the stripper 108. The chain is also entrained around a sprocket 168 that is fixed to spindle 124 in order to power the auger 122. Finally, the chain is entrained around a sprocket 170 that is fixed to shaft 93 of drum 69. If the blower 132 is to be operated from this power train, a pulley and belt or another chain and sprocket assembly can attach to any of the power shafts and to the shaft of the blower.

When the waste cotton harvester is being used, the shields straddle the plants in the rows and serve the bough lifting functions. This exposes the waste cotton that falls from the plants and is located on the soil under these boughs. The pickers, being inherently extensible by virtue of the extensible support and endless conveyor construction, can extend and retract in accordance with the irregularities of the soil. Moreover, they are capable of swinging slightly about the longitudinal axis of pivot shaft 88 to further follow the irregularities of the soil. The limit of movement of the pickers in one direction is established by the location of the rollers 142 and this location corresponds to the adjusted position of cam shaft 144. The rollers contact the extensible supports of the pickers and prevent the pickers from moving pivotally beyond a preset limit. This is especially important when transporting the harvester or when turning the harvester at the end of a row. As cam follower 146 or a roller on the ends of cam shaft 144 which will function as cam followers, are moved along the cam surface 141, a corresponding adjustment of each picker is caused, but this will in no way alter the articulation of each picker and its ability to extend and retract slightly in accordance with the necessities as the harvester is propelled through a cotton field.

It is understood that various changes may be made without departing from the invention and that the illustrated and described embodiment of the invention is by way of example only.

What is claimed as new is as follows:

1. In a waste cotton harvester, a frame, a plurality of pickers carried by said frame, means carried by said frame for receiving picked cotton from said pickers, at least one of said pickers including an endless conveyor, picking fingers on said conveyor, a rotary drum carried by said frame and over which said conveyor is entrained, an elongated extensible support pivoted at one end to said frame and extending rearwardly and downwardly therefrom, and means entraining said conveyor over the other end of said extensible support, and means on the lower end of said extensible support projecting slightly below the lower end of said conveyor adapted to engage the surface of the ground and maintain the lower end of said conveyor a slight distance from the ground whereby said picking fingers will engage and recover waste cotton lying on the ground without recovering particles of soil.

2. In a waste cotton harvester, a frame, a plurality of pickers carried by said frame, means carried by said frame for receiving picked cotton from said pickers, at least one of said pickers including an endless conveyor, picking fingers on said conveyor, a rotary drum carried by said frame and over which said conveyor is entrained, an elongated extensible support pivoted at one end to said frame and extending rearwardly and downwardly therefrom, means entraining said conveyor over the other end of said extensible support, and means on the lower end of said extensible support projecting slightly below the lower end of said conveyor adapted to engage the surface of the ground and maintain the lower end of said conveyor a slight distance from the ground whereby said picking fingers will engage and recover waste cotton lying on the ground without recovering particles of soil, a shield having a pair of side walls secured to said frame and disposed on opposite sides of said picker thereby forming a passageway for guiding cotton row plants and adjacent which said picker is operable, said passageway being disposed adjacent said conveyor whereby said picking fingers also engage and recover cotton from plants guided thereby.

3. In a waste cotton harvester, a frame, a plurality of pickers carried by said frame, means carried by said frame for receiving picked cotton from said pickers, at least one of said pickers including an endless conveyor, picking fingers on said conveyor, a rotary drum carried by said frame and over which said conveyor is entrained, an elongated extensible support pivoted at one end to said frame and extending rearwardly and downwardly therefrom, and means entraining said conveyor over the other end of said extensible support, means for pivotally adjusting said extensible support and including a cam secured to said frame, means including a cam follower on said cam and contacting said extensible support, and means operatively connected to said cam follower adjusting the latter on said cam to thereby adjust the pivotal disposition of the extensible support of said picker.

4. The harvester of claim 3 wherein said extensible support includes a pair of telescoped parts and a spring operatively connected between said parts yieldingly urging said support toward an extended position and thereby tightening said endless conveyor.

5. A waste cotton harvester for recovering cotton that remains on the ground after original harvest, said waste cotton harvester comprising a frame, a plurality of cotton plant shields each having a pair of spaced side walls secured to said frame for lifting the limbs of the cotton plants, each pair of side walls defining a passageway through which the plants of one row are adapted to pass, a group of pickers carried by said frame and located alongside of each passageway, at least one of said pickers comprising an inclined endless conveyor having a plurality of cotton picking fingers thereon, means pivotally connected to said frame supporting said conveyor in an elongate configuration with the lower end of said conveyor projected below the lower edge of said shields when said conveyor is in the cotton gathering position.

6. A waste cotton harvester for recovering cotton that remains on the ground after original harvest, said waste cotton harvester comprising a frame, a plurality of cotton plant shields each having a pair of spaced side walls secured to said frame for lifting the limbs of the cotton plants, each pair of side walls defining a passageway through which the plants of one row are adapted to pass, a group of pickers carried by said frame and located alongside of each passageway, at least one of said pickers comprising an inclined endless conveyor having a plurality of cotton picking fingers thereon, means pivotally connected to said frame supporting said conveyor in an elongate configuration with the lower end of said conveyor projected below the lower edge of said shields when said conveyor is in the cotton gathering position, means carried by said frame for adjusting the position of said conveyor supporting means thereby adjusting said conveyor to move the lower end thereof, and runners attached to said frame and trailing said shields.

7. A waste cotton harvester for recovering cotton that remains on the ground after original harvest, said waste cotton harvester comprising a frame, a plurality of cotton plant shields each having a pair of spaced side walls secured to said frame for lifting the limbs of the cotton plants, each pair of side walls defining a passageway through which the plants of one row are adapted to pass, a group of pickers carried by said frame and located alongside of each passageway, at least one of said pickers comprising an inclined endless conveyor having a plurality of cotton picking fingers thereon, means pivotally connected to said frame supporting said conveyor in an elongate configuration with the lower end of said conveyor projecting below the lower edge of said shields when said conveyor is in the cotton gathering position, said conveyor supporting means comprising an extensible support having extensibly connected parts, and a spring operatively connected between said parts yieldingly urging said support toward an extended position.

8. A waste cotton harvester for recovering cotton that remains on the ground after original harvest, said waste cotton harvester comprising a frame, a plurality of cotton plant shields each having a pair of spaced side walls secured to said frame for lifting the limbs of the cotton plants, each pair of side walls defining a passageway through which the plants of one row are adapted to pass, a group of pickers carried by said frame and located alongside of each passageway, at least one of said pickers comprising an inclined endless conveyor having a plurality of cotton picking fingers thereon, means pivotally connected to said frame supporting said conveyor in an elongated configuration with the lower end of said conveyor projected below the lower edge of said shields when said conveyor is in the cotton gathering position, a rotary cotton stripper carried by said frame and juxtaposed relative to said conveyor to extract the picked cotton from said fingers, a drum supporting the upper end of each endless conveyor, and means carried by said frame and operatively connected to said cotton stripper and said conveyor supporting drum for simultaneous actuation of said stripper and said supporting drum.

9. The harvester of claim 8 including an air duct having one end registered with said stripper, means carried by said air duct and operatively associated therewith for maintaining a flow of air therethrough away from said stripper to withdraw the stripped cotton and dispatch the cotton to a remote location.

10. A waste cotton harvester for recovering cotton that remains on the ground after original harvest said waste cotton harvester comprising a frame, a plurality of cotton plant shields each having a pair of spaced side walls secured to said frame for lifting the limbs of the cotton plants, each pair of side walls defining a passageway through which the plants of one row are adapted to pass, a group of pickers carried by said frame and located alongside of each passageway, at least one of said pickers comprising an inclined endless conveyor having a plurality of cotton picking fingers thereon, means pivotally connected to said frame supporting said conveyor in an elongate configuration with the lower end of said conveyor projecting below the lower edge of said shields when said conveyor is in the cotton gathering position, said conveyor supporting means comprising an extensible support having extensibly connected parts, and a spring operatively connected between and reacting on said parts yieldingly urging said support toward an extended position, one of said parts having a flat surface over which one flight of said endless conveyor is guided, and a debris deflector at the lower end of said picker.

11. In a waste cotton harvester which has a frame, means carried by said frame for receiving reclaimed waste cotton, and an improved waste cotton reclaiming mechanism carried by said frame for reclaiming waste cotton from the ground and delivering the cotton to said receiving means, the improvement comprising a group of pickers carried by said frame, each picker including an endless conveyor, picking fingers on said conveyor, extensible means carried by said frame and located within said endless conveyor and spreading said endless conveyor, said extensible means being yieldable to deflect slightly during actuation of said pickers, said extensible means including a mechanical element at one end thereof over which said endless conveyor is entrained, and rotatable means carried by said frame and over which the other end of said conveyor is entrained for actuating said conveyor, means on said one end of said extensible member projecting slightly beyond said conveyor and adapted to engage the ground whereby said fingers will engage and recover cotton waste lying on the ground without recovering particles of soil, and said extractor juxtaposed to the fingers on said endless conveyor to remove the picked cotton therefrom.

12. In a waste cotton harvester which has a frame, means carried by said frame for receiving reclaimed waste cotton, and improved waste cotton reclaiming mechanism carried by said frame for reclaiming waste cotton from the ground and delivering the cotton to said receiving means, the improvement comprising a group of pickers carried by said frame, each picker including an endless conveyor, picking fingers on said conveyor, extensible means carried by said frame and located within said endless conveyor and spreading said endless conveyor, said extensible means being yieldable to deflect slightly during actuation of said pickers, said extensible means including a mechanical element at one end thereof over which said endless conveyor is entrained, and rotatable means carried by said frame and over which the other end of said conveyor is entrained for actuating said conveyor, means on said one end of said extensible member projecting slightly beyond said conveyor and adapted to engage the ground whereby said fingers will engage and recover cotton waste lying on the ground without recovering particles of soil, said extractor juxtaposed to the fingers on said endless conveyor to remove the picked cotton therefrom, plant shields carried by said frame and each shield including a pair of spaced walls between which the plants of a row are adapted to pass, guides at the front edges of said spaced walls to guide the plants between said spaced walls in which position the boughs of the plants are elevated thereby disposing the soil beneath the boughs so that the pickers adjacent to said shield may recover the cotton therefrom.

13. The combination of claim 11 wherein at least some of said fingers consist of a coil of wire carried by one of said endless conveyors, and an end of said coil protruding from the surface of said conveyor to form the picking finger.

14. In a cotton harvester that has a frame, a picker comprising an endless conveyor, a rotary means carried by said frame and over which one end of said conveyor is entrained, extensible means carried by said frame and having a mechanical element over which the other end of said conveyor is entrained, picker fingers carried by said endless conveyor, and a spring constituting a part of said extensible means and applying a yielding force whose reaction is received in said endless conveyor and in a direction which tends to elongate said conveyor and thereby function as a tightener for the conveyor, ground engaging means carried by said extensible means projecting beyond said other end of said conveyor whereby said picker fingers will engage and recover waste cotton lying on the ground without engaging the latter to insure that unwanted soil will not be recovered with the cotton waste.

15. The combination of claim 14 including adjusting means secured between said frame and said extensible means for pivotally adjusting the latter and thereby pivotally adjusting the disposition of said picker.

16. The combination of claim 15 wherein said extensible means is provided with at least one surface engageable by a part of said endless conveyor over which the latter is guided.

References Cited in the file of this patent

UNITED STATES PATENTS

| | | |
|---|---|---|
| 2,641,890 | Baird | June 16, 1953 |
| 2,660,848 | Rust | Dec. 1, 1953 |
| 2,670,584 | Rood, et al. | Mar. 2, 1954 |
| 2,674,076 | Bryant | Apr. 6, 1954 |